(12) United States Patent
Jancic (10) Patent No.: US 10,964,297 B2
(45) Date of Patent: Mar. 30, 2021

(54) CARRYING DEVICE FOR MUSICAL INSTRUMENTS

(71) Applicant: Silvin Jancic, Villmergen (CH)

(72) Inventor: Silvin Jancic, Villmergen (CH)

(*) Notice: Subject to any disclaimer, the term of this patent is extended or adjusted under 35 U.S.C. 154(b) by 0 days.

(21) Appl. No.: 16/737,287

(22) Filed: Jan. 8, 2020

(65) Prior Publication Data

US 2020/0219471 A1 Jul. 9, 2020

(51) Int. Cl.
*G10G 5/00* (2006.01)

(52) U.S. Cl.
CPC .................................. *G10G 5/005* (2013.01)

(58) Field of Classification Search
CPC ....................................................... G10G 5/005
USPC ............................................................ 84/453
See application file for complete search history.

(56) References Cited

U.S. PATENT DOCUMENTS

| | | | | | |
|---|---|---|---|---|---|
| 1,637,003 | A | * | 7/1927 | Lang | G10G 5/00 224/258 |
| 1,891,947 | A | * | 12/1932 | Powell | G10G 5/005 224/258 |
| 2,561,606 | A | * | 7/1951 | Bates | G10G 5/005 224/258 |
| 2,615,324 | A | * | 10/1952 | Meeker | A44B 15/00 70/459 |
| 3,057,526 | A | * | 10/1962 | Jaquith | G10G 5/005 224/258 |
| 3,225,984 | A | * | 12/1965 | Hyman | G10G 5/005 224/258 |
| 3,296,950 | A | * | 1/1967 | Starp | G03B 9/58 396/504 |
| 3,361,615 | A | * | 1/1968 | Schmidt | A47G 33/0818 428/11 |
| 3,930,289 | A | * | 1/1976 | Singular | F16G 11/10 24/635 |
| 4,005,765 | A | * | 2/1977 | Reilly | B60N 2/4242 188/372 |

(Continued)

FOREIGN PATENT DOCUMENTS

| | | |
|---|---|---|
| CH | 704201 A2 | 6/2012 |
| DE | 3225476 A1 | 2/1983 |
| KR | 20030091837 A | 12/2003 |

*Primary Examiner* — David S Warren
*Assistant Examiner* — Christina M Schreiber
(74) *Attorney, Agent, or Firm* — Lathrop GPM LLP; Wm. Tucker Griffith (57) ABSTRACT

A device for adjusting the length of a cord for carrying a wind instrument comprises two parts which can be pushed into one another, of which the first cup-shaped part has a recess and four openings and the second part has, as insert, a groove with a U-turn as well as a recess and two guide grooves. A cord piece is guided around the groove, out of the device and through an eyelet of a hook. A further cord piece is guided through the guide grooves and the four openings. The device allows the cord piece to be guided through the groove, which is completely separated from the guidance of cord pieces through the guide grooves. The guide grooves contain elements for deflecting and inhibiting the movement of the cord pieces. The device enables a stable and torsion-proof handling of the length adjustment of the cord. The device makes it possible that the cord length cannot adjust automatically, not even if the cord is not tensioned.

12 Claims, 9 Drawing Sheets

(56) References Cited

U.S. PATENT DOCUMENTS

| | | | | |
|---|---|---|---|---|
| 4,367,830 A * | 1/1983 | Jaquith | G10G 5/00 224/258 |
| 4,715,259 A * | 12/1987 | Wittman | G10D 3/00 224/910 |
| 4,815,642 A * | 3/1989 | Ray | A45F 3/14 12/120.5 |
| 4,884,322 A * | 12/1989 | Jaquith | B66C 1/66 24/634 |
| 5,437,401 A * | 8/1995 | Seltzer | A45F 3/02 224/153 |
| 6,036,066 A * | 3/2000 | Giacona, III | A45C 13/30 224/148.6 |
| 6,454,109 B1 * | 9/2002 | Doyle | D06F 53/00 211/119.01 |
| RE40,097 E * | 2/2008 | Erismann | G10D 1/085 84/267 |
| 7,655,853 B1 * | 2/2010 | Ricca | G10G 5/005 84/385 A |
| 8,051,542 B2 * | 11/2011 | Buday | A44B 11/266 24/615 |
| 8,534,515 B2 * | 9/2013 | Muchin | A01D 34/902 224/264 |
| D772,577 S * | 11/2016 | Muchin | D3/327 |
| 10,070,700 B1 * | 9/2018 | Chen | A44B 11/10 |
| 2005/0258205 A1 * | 11/2005 | French | A45F 3/12 224/264 |
| 2008/0163738 A1 * | 7/2008 | Rosenberg | G10G 5/005 84/421 |
| 2013/0263718 A1 * | 10/2013 | Jancic | G10G 5/005 84/387 A |
| 2015/0300082 A1 * | 10/2015 | Lai | E06B 9/326 160/170 |
| 2017/0206871 A1 * | 7/2017 | Steinberger | A44B 17/0076 |
| 2020/0219471 A1 * | 7/2020 | Jancic | F16G 11/14 |

* cited by examiner

CARRYING DEVICE FOR MUSICAL INSTRUMENTS

FIELD OF THE INVENTION

The invention relates to a device for adjusting the length of a cord for carrying a musical instrument, in particular a saxophone, bass clarinet, bassoon or similar wind instrument.

DESCRIPTION OF THE PRIOR ART

Due to its weight, a wind instrument such as a saxophone is often carried by a carrying device on the neck or shoulders. Such a carrying device comprises a carrying strap, also called a neck strap, which is placed around the neck or a carrying frame which is placed on the shoulders, and a cord which is attached to the carrying strap or frame on the one hand and to the instrument on the other hand with a hook. A carrying frame as mentioned is disclosed for example in CH 704201. A carrying strap or carrying frame with a cord makes it possible to play a heavy instrument over a long period of time without the musician getting too tired.

A cord for such a carrying device is, for example, double looped at the hook, as disclosed for example in U.S. Pat. No. 1,637,003, wherein the double loop leads over a slide. The slide can be moved up and down, thus varying the length of the double loop and the height position of the instrument. The slide comprises a cuboid element which is placed together with a spring in a cup-shaped element. The cuboid and the cup-shaped element each contain an opening through which three sections of the cord can be guided, wherein the three sections touch each other in the opening. When the spring is released, the openings overlap only partially, so that the sections of the cord are clamped there. The slide is held between thumb and finger, and to change the length of the cord, thumb and finger are pressed together, so that the cuboid element is pressed against the spring force into the cup-shaped element and the two openings overlap more. The cord sections in the opening have more play and the slide can be moved along the cord. If the thumb and finger are relieved again, the opening narrows and the cord sections are pressed together in the reduced opening and the slide is thereby locked.

Other adjustment and clamping devices available on the market for cords for instruments are set in such a way that the loop of the cord is held very tight by the adjustment element, which prevents unintentional slipping downwards, but makes readjustment more difficult during playing or a short break.

Cords are round cords or flat cords. Round cords are twined or twisted with a round cross-section. Flat cords are cords with an elongated cross-section like that of a strap.

DESCRIPTION OF THE INVENTION

It is the object of the invention to create a device for adjusting the length of a cord for fastening a musical instrument to a carrying device, wherein such a device for adjusting the length on the one hand allows the height of the instrument to be adjusted easily, but on the other hand prevents the device from slipping unintentionally and the instrument from slipping down as much as possible.

This object is solved by a device according to claim 1.

The device according to the invention for adjusting the length of a cord is designed to accommodate a double and single guided cord and to change the length of the cord guided in this way. The single guided cord can be attached to a neck or shoulder carrying device for a musical instrument, wherein the double guided cord can be connected to a hook for the musical instrument.

The device for adjusting the length of a cord or strap has two parts, a cup-shaped first part and an insert as a second part, wherein the two parts can be pushed into each other and a spring is arranged between the two parts.

According to the invention, the cup-shaped first part has a base and a circumferential edge, wherein the circumferential wall of which has a recess or an entrance opening for the passage of two cord pieces or two straps and at least two further openings for two cord pieces or two straps. One or more first openings of these at least two further openings are located adjacent to said recess or entrance opening and one or more further openings are located opposite the first or more openings in the circumferential edge.

The second part of the device for adjusting the length of a cord or a strap is designed as an insert in the cup-shaped first part and has a groove with a U-turn formed by a circumferential edge of the insert and a middle part. The U-turn has a is shape of a U or an O. The circumferential edge of the insert has a recess that leads into the groove. The groove serves to accommodate at least one cord piece, which can be guided through the recess into the groove, along the groove with the turn and again through the recess out of the groove. The cord piece guided in this way forms, according to the groove, the shape of the U-turn. The insert also has at least one channel for a cord piece or strap, each leading from an entrance next to the recess or entrance opening to an exit respectively opposite the entrance. The at least one channel has elements for deflecting and inhibiting the movement of a cord and is completely separated from the groove with the U-turn, i.e. the recess or entrance opening leading to the groove with the U-turn is completely separated from the entrance to the at least one channel.

In a first embodiment, the cup-shaped first part has a base and a circumferential edge, wherein a recess for two cord pieces and four further openings for one cord piece are each arranged in its circumferential edge. The first and second of these four further openings are on both sides of the recess, and the third and fourth opening are arranged opposite the first and second opening in the circumferential edge.

The second part of the length adjustment device is designed as an insert in the cup-shaped first part and has a groove with a U-turn formed by a circumferential edge of the insert and a middle part. The circumferential edge of the insert has a recess that leads into the groove. The groove serves to accommodate a cord piece, which can be guided through the recess into the groove, along the groove with the turn and again through the recess out of the groove. The cord piece guided in this way forms the shape of a U-turn according to the groove. The insert also has two channels, designed as guide grooves, for cord pieces, which are arranged on the outside of its circumferential edge and on both sides of the recess. By arranging the guide grooves on both sides of the recess, i.e. on each side of the recess, they lead in each case from an entrance adjacent to the recess to an exit opposite the entrance. The two guide grooves also have elements for deflecting and inhibiting the movement of a cord. The two lateral guide grooves are completely separated from the groove with the U-turn, i.e. the recess leading is to the groove with the U-turn is completely separated from the entrances to the lateral guide grooves.

This embodiment is suitable for the length adjustment of cords with a round and elongated cross-section.

In one embodiment of the invention, the insert has a recess in its middle part to accommodate the spring.

In one embodiment of the invention, the elements for inhibiting the movement of a cord through the guide grooves are formed by mutually angled surfaces. The mutually angled surfaces can meet at a point or be connected to each other by another surface. These elements deflect a cord in the guide groove in the manner of a simple zigzag, thus causing the cord to rub against the guide grooves and thereby inhibiting the movement of the cord. If, as in use with a musical instrument, the device is held so that the cords hang vertically, the deflection elements ensure that the cords in the guide grooves are first led sideways away from the vertical direction and then back again.

In another embodiment of the invention, the elements for deflecting and inhibiting the movement of a cord through the guide grooves include projections in the cup-shaped first part extending perpendicularly from the inner base of the first part and in addition recesses in the insert, which are located in its circumferential edge. The recesses in the insert are arranged according to the position of the projections in the cup-shaped portion so that when the insert is inserted, the projections engage in the recesses, extend through the recesses and project into the guide grooves. The projections in the guide grooves thus result in a deflection of a cord in the guide groove again in the manner of a simple zigzag, first at an angle away from the vertical and then back again.

In another embodiment, the cup-shaped part has a pin in the center for fixing the position and aligning the spring. The pin is positioned in this case according to the position of the recess in the insert, so that when the insert is inserted into the cup-shaped part, the pin is inserted into the recess in the insert.

For the use of the first embodiment of the device according to the invention for adjusting the length of a cord, a first piece of the cord is inserted into the insert by placing the cord piece into the groove with the turn and leading its ends through the recess out of the insert. The ends are then attached to a hook that can be attached to an instrument, for example by guiding the ends through an eyelet on the hook. The insert with the cord in the groove with the U-turn is then inserted into the cup-shaped first part in which a spring is placed. The insert part is placed so that the position of the recess with the cord piece leading in and out coincides with the position of the recess in the cup-shaped first part and the cord pieces also pass through the recess in the first part. The entrances and exits of the two lateral guide grooves in the insert also correspond in this case to the four openings in the cup-shaped first part. The two ends of the cord are then guided through the openings in the cup-shaped part and the entrances of the lateral guide grooves in the insert, through the guide grooves of the insert, through the exits of the guide grooves and through the opposite openings in the cup-shaped part out of the adjustment device. Finally, the ends of the cord are attached to a neck strap or a carrying device for a musical instrument.

For example, the spring is positioned through the recess in the middle of the insert and the pin in the cup-shaped part.

The two parts of the device are held together by the positioning of the cord in the guide grooves and in the four openings of the cup-shaped part. The cord pieces are clamped in this case in the cup-shaped part by the spring force of the spring between the entrances and exits of the guide grooves in the insert and the edge of the openings.

To adjust the length of the cord, the insert is pushed deeper into the cup-shaped part whereby the spring is compressed. The openings in the cup-shaped part thus correspond exactly to the openings in the insert, so that the entrances to the guide grooves become larger and the cord pieces in the guide grooves are freely movable. Then the device can be moved up or down (from the musician's point of view) and the length of the double guided cord pieces, i.e. She cord pieces between the device and the hook on the musical instrument, can be increased or decreased. Once the desired length has been found, the pressure on the device is released, thus releasing the spring and moving the insert slightly out of the cup-shaped part again. In this process, the entrances and exits of the lateral guide grooves are again reduced in size in that the entrances and exits in the insert no longer exactly coincide with the four openings in the cup-shaped part and are thereby narrowed.

In this process, the entrances and exits of the guide grooves for the single guided cord are narrowed again by slightly lifting the insert part out of the cup-shaped part and by pressing the cord pieces in the openings of the cup-shaped part at their edges. The cord pieces are thus clamped in the openings and held in position. The cord pieces are thus clamped and locked between the guide grooves and the edge of the four openings in the cup-shaped first part. The length of the cord and the position of the musical instrument thus remain constant.

In a second embodiment of the invention, the cup-shaped first part has an entrance opening for the passage of two cord pieces or two straps. Instead of four further openings at the circumferential edge of the cup-shaped part, however, the cup-shaped part has only two further openings. One opening thereof is located next to the entrance opening for the passage of two cord pieces or two straps and the second opening is located opposite the first opening on the circumferential edge of the cup-shaped part. The second part of the device, i.e. the insert, has only one channel formed as a passage which leads from an entrance next to the recess to an exit opposite the entrance. The passage has elements for deflecting to and inhibiting the movement of cords or straps. The groove with the U-turn is again completely separated from the entrance of the channel. This means that the recess leading to the groove is separated from the entrance to the channel.

This embodiment is suitable for the length adjustment of a flat cord or a strap.

In one embodiment of the invention, the elements for inhibiting the movement of a cord or strap through the channel are formed by mutually angled surfaces. The mutually angled surfaces can meet at a tip or be connected to each other by another surface. The angle between the surfaces is more than 90°. These elements guide a cord, such as a flat cord, or a strap in the passage in the manner of a simple zigzag, causing friction of the cord or strap on the surfaces of the passage, thereby inhibiting the movement of the cord or strap. If, as in use with a musical instrument, the device is held so that the cords or straps hang vertically, the deflection elements cause the cords or straps in the passage to be first deflected sideways away from the vertical direction and then back again.

In one embodiment, the insert has a depression in its middle part to accommodate the spring.

To use the second embodiment of the device according to the invention for adjusting the length of a cord or a strap, two straps are placed on top of each other, for example. The straps are provided with a hole near their free ends. The free ends of the two straps are then guided from the outside through the entrance opening in the cup-shaped first part and placed so that the hole in the straps lies above a depression in the base of the outer cup-shaped part. The insert with the middle part is then inserted into the cup-shaped part, wherein the middle part with the spring engages through the hole in the straps and into the depression. The two parts are then placed into each other and pressed together with the spring. The position of the recess with the leading out straps then coincides with the position of the entrance opening in the cup-shaped first part, so that the straps lead straight through the recess of the groove in the insert part and through the entrance opening in the cup-shaped part. The straps protruding from the device are then attached to a hook which can be attached to a musical instrument, for example by guiding the ends through an eyelet on the hook. Then the ends of the superimposed straps are guided through the first opening in the cup-shaped part and the entrance of the passage in the insert, through the passage of the insert, through the exit of the passage and through the opposite second opening in the cup-shaped part again out of the length adjustment device. For this purpose, the openings in the insert and in the cup-shaped part are formed in an elongated manner and adapted to the cross-section of a strap. Finally, the ends of the straps are attached to a neck strap or to a carrying device for a musical instrument.

The two parts of the device are held together by the positioning of the straps in the passage and in the two openings of the cup-shaped part. The straps are clamped between the entrance and exit of the passage in the insert and the edge of the openings in the cup-shaped part due to the spring force of the spring.

In order to adjust the length of the straps, the insert is pushed deeper into the cup-shaped part and the spring is compressed in the same way as when the first embodiment of the invention is used. The openings in the cup-shaped part thus correspond exactly to the openings in the insert, so that access to the passage is larger and the straps can move freely in the passage. The device can then be moved up or down (from the musician's point of view) and the length of the double guided straps, i.e. the straps between the device and the hook on the musical instrument, can be increased or decreased. Once the desired length has been found, the pressure on the device is released, thus releasing the spring and moving the insert slightly out of the cup-shaped part again. In this process, the entrances to the passage are reduced again by the entrances and exits of the passage no longer exactly coinciding with the two openings in the cup-shaped part and being narrowed.

The entrances and exits of the guide grooves for the single guided cord are narrowed again by slightly lifting the insert out of the cup-shaped part and pressing the cord pieces in the openings of the cup-shaped part at their edges. This will clamp the straps in the openings and hold them in position. The straps are thus clamped and locked between the guide grooves and the edge of the two openings in the cup-shaped first part. The length of the straps and the position of the musical instrument thus remain constant.

The device according to the invention has the advantage over the prior art devices, in particular U.S. Pat. No. 1,637,003, that the lateral guide grooves in the insert part are completely separated from the groove with the turn. Thus, the cord piece, which extends along a U-turn in the middle groove in the insert to double guide the cord, does not come into contact with the cord pieces in the lateral guide grooves of the insert. The cord pieces in the several grooves extend in this order, remain unaffected by each other and always remain the same in their directional orientation. This makes it possible to keep the device according to the invention always oriented towards the musician and to avoid twisting of the device and the cord. In addition, the adjustment of the cord length requires less force than with a device according to U.S. Pat. No. 1,637,003. The use of the device is thus facilitated and allows increased calm when playing music.

The separation of the guidance of the cord piece in the groove with the U-turn and the guidance of the cord pieces in the guide grooves of the insert provides stability with regard to twisting of the device. The device remains in the same position thanks to the separation of the cord pieces in that the base surface of the cup-shaped part always lies in the same plane. This allows the musician to grip the device more easily and reliably. This makes the use of the device easier and calmer.

While playing the musical instrument, the cord is stretched by the weight of the instrument. The elements for deflecting and inhibiting the movement of the cord in the guide grooves allow the stability of the respectively adjusted length of the cord by friction. If, on the other hand, the musician holds the instrument up with his hands, the cord is not tensioned. In this situation, the spring-loaded clamping of the cord between the insert and the cup-shaped part of the device ensures the stability of the respectively adjusted length of the cord. The device makes it to possible that the cord length cannot adjust automatically, not even if the cord is not tensioned.

The cord pieces are held in place by the elements for deflecting and inhibiting the movement of the cord pieces as well as by the narrowing of the entrances and exits of the guide grooves after the desired length of the cord has been determined. The cord does not release itself when playing music. An unwanted extension cannot occur. Thanks to the separation of the cord pieces by the mutually independent guide grooves, the cord remains intact even longer and after frequent length adjustment, because the cord pieces do not touch each other and do not rub against each other. The device according to the invention can thus remain in use longer. No serrations, barbs or the like are necessary in the guidance to hold the cord by friction. A premature fraying of the cord can thus be avoided.

The device according to the invention is suitable for use with various types of carrying devices for musical instruments, including carrying devices with a carrying strap (neck strap) around the neck and carrying devices with a carrying frame carried on the shoulders to which the cord pieces can be attached. The device is particularly suitable for wind instruments such as saxophone, bass clarinet and bassoon.

A carrying device for carrying a musical instrument is also disclosed, comprising a carrying strap for the neck or a carrying frame for shoulders, a cord or a strap, an attachment of the cord to the musical instrument, wherein the carrying device comprises a device according to the invention for adjusting the length of the cord as described.

One embodiment of the carrying device has a hook with an eyelet to attach the cord to the musical instrument.

Further advantages of the invention follow from the following description, in which to the invention is explained in more detail by means of two embodiments shown in the schematic drawings.

BRIEF DESCRIPTION OF THE FIGURES, WHEREIN

FIGS. 1-14 show the first embodiment of the invention.
FIGS. 15-21 show the second embodiment of the invention.

FIGS. 9-14 show a variant of the first embodiment of the invention, of which

The same reference numerals have respectively been used in the figures for the to same elements and initial explanations apply to all figures, unless explicitly stated otherwise.

EMBODIMENTS OF THE INVENTION

Figure 1:
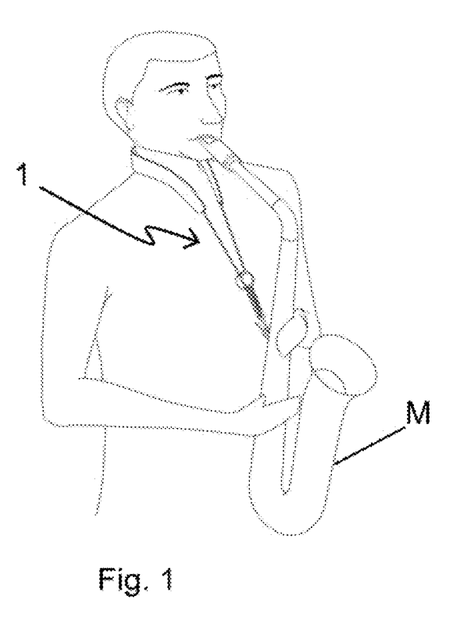
FIG. 1 shows a musician with a carrying device for carrying a wind instrument, such as a saxophone, on which a first embodiment of the device according to the invention can be used.
Figure 2:
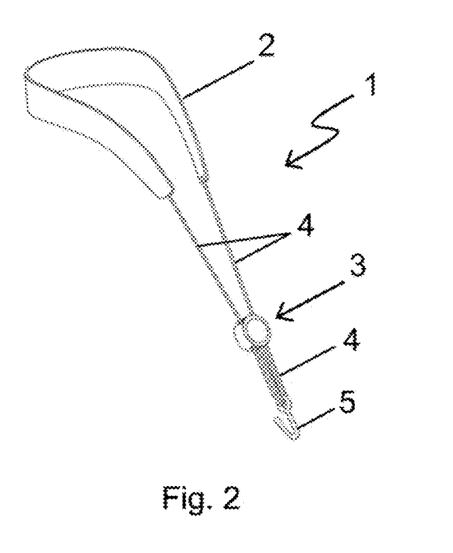
FIGS. 2 and 3 show the carrying device from FIG. 1 alone with a cord for fastening to a musical instrument as well as carrying straps for the neck, as well as with the device according to the invention for adjusting the length of the cord.

FIGS. 1 to 2 show a carrying device 1 for a saxophone, for example, or similar wind instrument M with carrying strap 2 (also called neck strap), which the musician carries around the neck and at the ends of which a cord 4 is attached. The cord 4 leads into a device 3 according to invention for the length adjustment of the cord 4, wherein the cord 4 leads out again at the lower end of the device 3 and is guided in double loop through the eyelet of a hook 5. The hook 5 can be hooked into the musical instrument M and fastened thereto.

Figure 3:
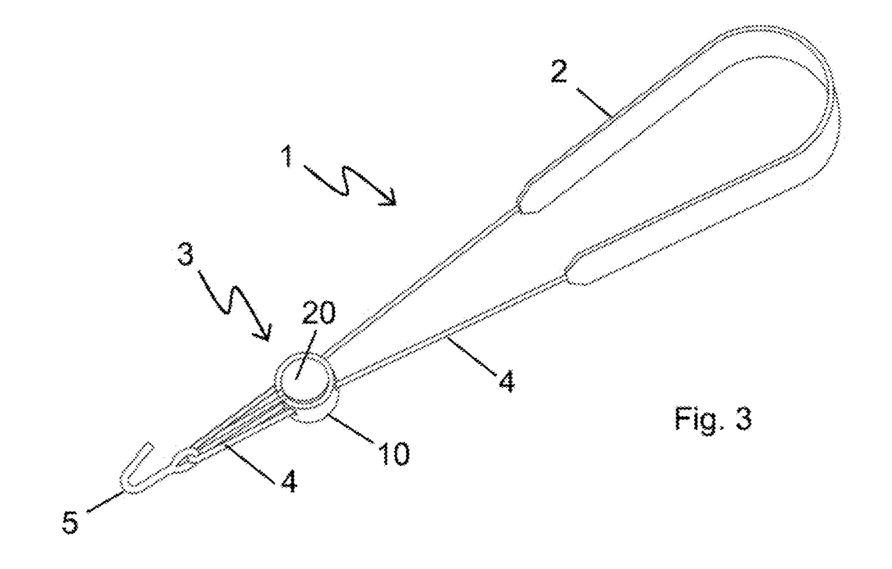

FIG. 3 shows the carrying device 1 slightly enlarged and in particular two parts of the device 3, an outer first part 10 and an inner second part 20. Single guided cord pieces 4 lead from the carrying strap 2 through openings in parts 10 and 20 at the upper end of the device 3 into these. Double guided cord pieces 4 lead through further openings in parts 10 and 20 at the lower end of the device 3 to the eyelet 5' of hook 5.

Figure 4:
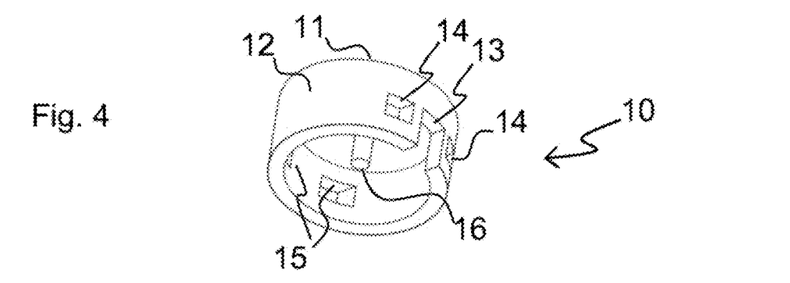
FIG. 4 shows a cup-shaped first part of the device according to invention according to FIGS. 2 and 3 for length adjustment of the cord in one view in perspective.
Figure 5A:
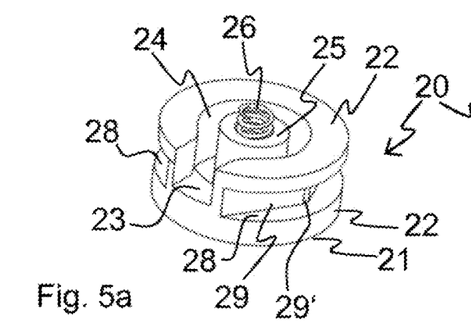
FIG. 5a shows an insert of the device according to FIGS. 2 and 3 in a first view in perspective from below.

FIG. 4 shows a cup-shaped first part 10 of the device according to the invention from FIGS. 1-3, which is formed round in the embodiment shown and has a round base 11 with a circumferential edge 12. At one point of the circumferential edge 12 there is a recess 13 for accommodating a double guided cord piece, which can be guided through a groove with U-turn in the insert, as shown in FIG. 5a. Two openings 14 are arranged on both sides of the recess 13, through each of which a further cord piece can be guided. Opposite the two openings 14, two further openings 15 are arranged in the circumferential edge 12, through which the aforementioned cord pieces can be guided out of the device according to the invention. In the middle, inside the cup-shaped part 10, a pin 16 is arranged in this embodiment, which serves to position a spiral spring.

Figure 5B:
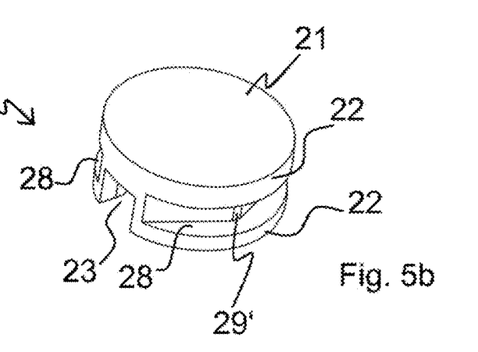
FIG. 5b shows the insert of FIG. 5a in a second view in perspective from above.

FIGS. 5a and b show an insert 20 that can be inserted into the cup-shaped part of FIG. 4. The shape of the insert 20 is adapted to the cup shape of the first part 10 and has an upper surface 21 and a circumferential surface 22. A recess 23 is arranged on the circumferential surface 22. If the insert 20 is inserted into the first part 10, the insert 20 is enclosed by the circumferential edge 12 and the recesses 13 and 23 of the two parts 10 and 20 coincide in their position.

The insert 20 has a groove 24 which extends away from recess 23 and forms a U-shaped turn or other similar turn, wherein the turn is approximately 180°. In the middle of the insert 20, enclosed by the groove 24, there is a middle part 25 with a depression in which a spring 26 can be placed. When inserting the insert 20 into the cup-shaped part 10, the pin 16 engages in the depression as well as in the spring 26.

The insert 20 also has two symmetrically arranged lateral guide grooves 28 in the circumferential surface 22 which begin on both sides of the recess 23 and extend along the surface 22 around a part of the insert 20, wherein their ends are preferably disposed on the side of the insert 20 opposite the recess 23. The guide grooves 28 are used to guide cord pieces. According to the invention, they have elements for deflecting and inhibiting the movement of cords. In the illustrated embodiment, these elements are in the form of beveled surfaces 29, which lead to each other and meet in a tip 29'.

Figure 6A:
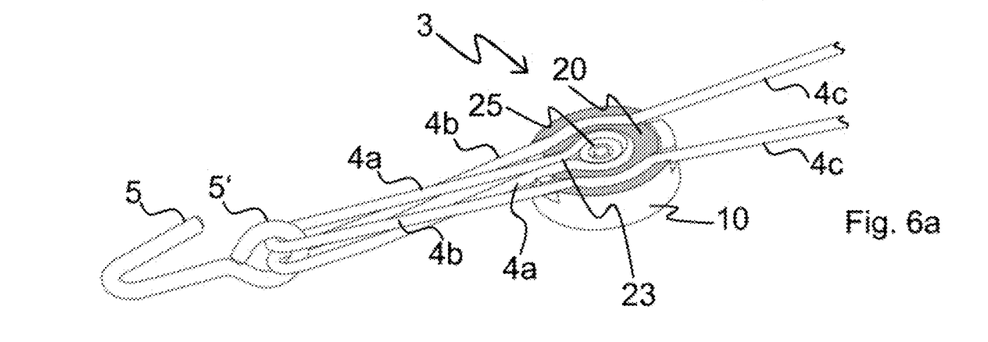
FIG. 6a shows a view of the insert from FIGS. 5a and 5b inserted in the first part in a sectional view at half height through the insert and cord pieces arranged therein and guided through the eyelet of a hook.
Figure 6B:
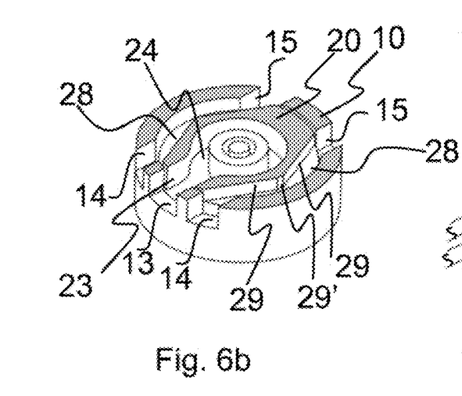
FIG. 6b shows the insert and first part from FIG. 6a without the cord pieces.
Figure 6C:
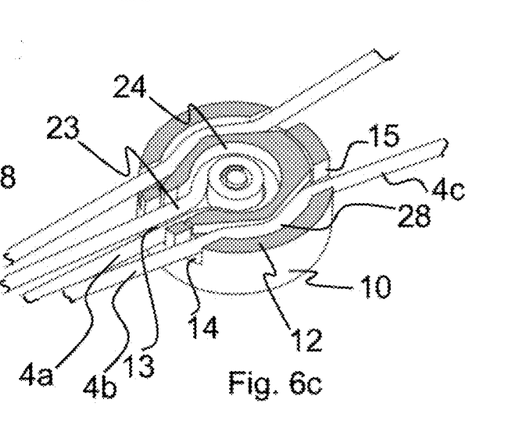
FIG. 6c shows an enlarged view of the insert and first part of FIG. 6a, FIG. 7 shows a view of a section of the device according to the invention, comprising an assembled first part and insert, wherein the section is at the height of the upper edge of the cup-shaped part and the guide grooves of the insert.

FIGS. 6a-c show the composition of the two parts 10 and 20, wherein the device 3 is shown cut open. FIGS. 6a and c also show the arrangement of cord pieces in the device 3 according to the invention.

First a cord piece 4a is inserted into the insert 20, in particular into the groove 24 with the U-turn and around the middle part 25. The two ends of the cord piece 4a then lead through the recess 23 of the insert 20 and the recess 13 of the cup-shaped part 10 out of the device 3 and are tied through the eyelet 5' of the hook 5. After the eyelet 5', the two cord pieces, now marked 4b, lead back to device 3 and through the openings 14 of the cup-shaped part 10 and along the guide grooves 28 of the insert 20. The cord pieces 4b then lead on the opposite side out of the guide grooves 28 of the insert 20 and through the openings 15 of the cup-shaped part 10 out of the device 3 again. Then the cord pieces, now marked 4c, lead to a carrying strap or carrying frame as shown in FIGS. 1-3. In the guide grooves 28, the cord pieces are guided along the two surfaces 29 running towards each other and around the surface 29' which connects the surfaces 29, wherein the cord pieces are guided on the outer side of the groove 28 from the inner surface of the circumferential edge 12 of the cup-shaped part 10. The peculiarity of the invention is the separate guidance of the cord pieces 4a and 4b, in that these lead through separate openings or recesses 13, 14 and 23 and the cord piece in the groove 24 with U-turn does not touch the cord pieces in the lateral grooves 28.

If the length of the cord is changed, the length of the cord pieces 4a and 4b is changed, i.e. the length of the double guided cord is extended or shortened. The length of the single guided piece 4c also changes accordingly. With a length adjustment, however, the part of the cord which is located in the groove 24 with U-turn always remains in place. Only the parts of the cord move that lead through the guide grooves 28. The device 3 can be moved along the cord pieces in the guide grooves 28 when the insert 20 is pressed into the cup-shaped part 10 against the force of the spring 26, so that the openings 14 and 15 coincide most with the entrances and exits of the guide grooves 28. Then the device 3 can be moved up or down or the cord length can be shortened or lengthened. If the pressure on the insert 20 and on the spring 26 is decreased, the spring releases and the insert 20 moves slightly out of the cup-shaped part 10 again. In this process, the entrances and exits of the guide grooves 28 become narrower and the cord pieces are firmly clamped between the two parts 10 and 20.

Figure 7:
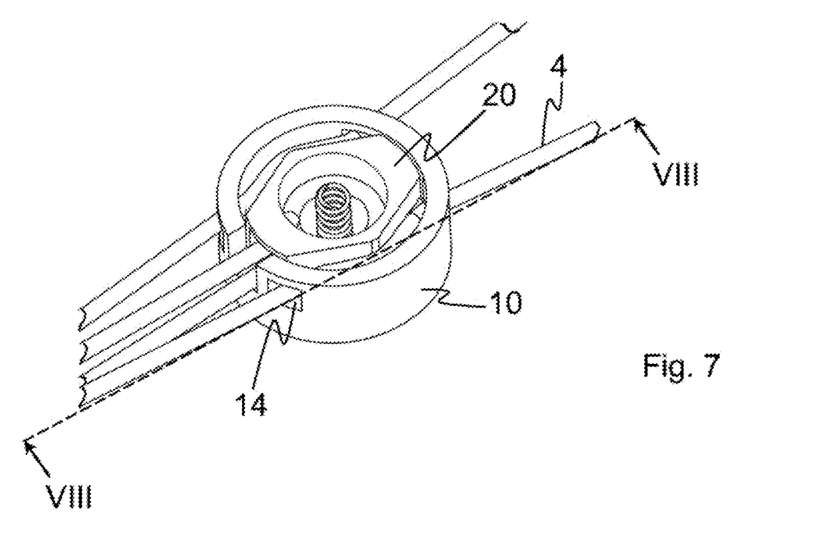
Figure 8:
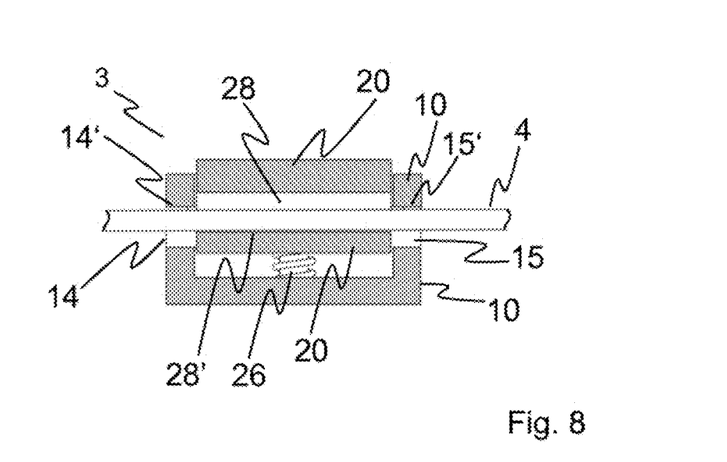
FIG. 8 shows a view according to the section VIII-VIII in FIG. 7 of the device with the two interlaced parts and a cord piece which is tightly clamped with the spring released.
Figure 9:
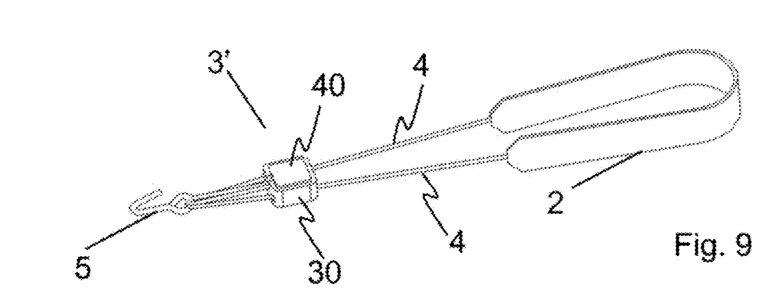
FIG. 9 shows a carrying device with a cord for attachment to a musical instrument and a carrying strap for the neck, and with the variant of the first embodiment of the device according to the invention for adjusting the length of the cord.

FIG. 8 shows the device 3 in a section according to VIII-VIII in FIG. 7 and shows the mechanism of tightly clamping the cord pieces in the device 3 when the spring 26 is released. After the desired length of the cord has been selected, the insert 20 is pushed slightly out of the cup-shaped part 10 by the spring 26. In this process, the guide groove 28 also moves, so that its entrances and exits move over the height of the openings 14 and 15 of the cup-shaped part 10, and the cord 4 in the guide groove 28 is clamped between the edge 14' and 15' of the openings 14 and 15, respectively, and the one surface 28' of the guide groove 28 in the insert 20. This locks the movement of the cord 4.

The elements for deflecting the cord in the guide grooves, i.e. the surfaces 29 of the guide grooves 28 leading obliquely to each other, cause due to the friction that the position of the device according to the invention cannot change under the weight of the musical instrument. If the musical instrument weighs more, the friction in the deflection also increases. The spring 26 between the cup-shaped part 10 and the insert 20 of the device serves mainly to lock the device when the musical instrument is held high by the musician and the cord is not tensioned and the deflection does not generate friction.

Figure 10:
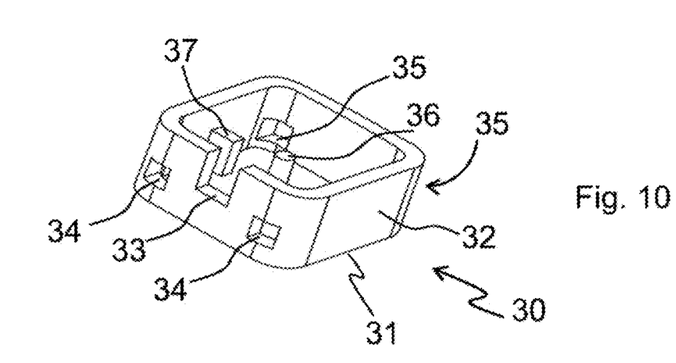
FIG. 10 shows a cup-shaped first part of the variant of the first embodiment of the device according to the invention according to FIG. 9 in a view in perspective from above.

FIGS. 9-14 show a variant of the first embodiment of the device 3' according to the invention. It again comprises a first, cup-shaped part 30 and an insert 40 that can be inserted into it. The functionality of this variant is the same as that of the device 3 from FIGS. 1-8. The shape of the cup-shaped part 30 and the insert 40 is angular in this variant. Part 30, as shown in FIG. 10, with a base 31 and a circumferential edge 32, again has a recess 33 in the edge 32 as well as two openings 34 and 35 each, through which the cord is guided. The two openings 34 are located on both sides of the recess 33, wherein the other two openings 35 are disposed on the opposite side of part 30. In the middle of the cup-shaped part 30, a pin 36 is arranged again for positioning a spring.

Figure 11A:
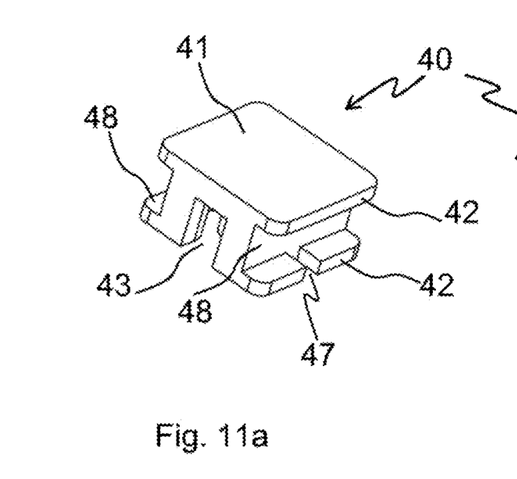
FIG. 11a shows an insert of the device according to FIG. 9 in a first view in perspective from above.
Figure 11B:
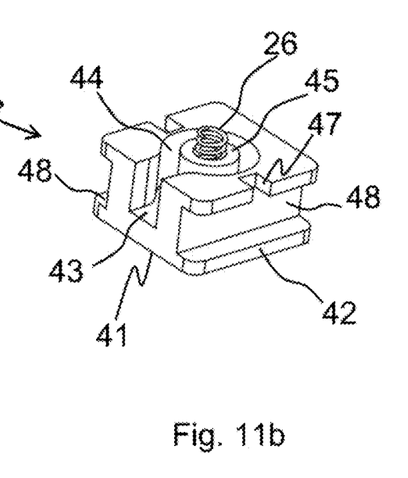
FIG. 11b shows the insert of FIG. 9 in a second view in perspective from below.
Figure 13A:
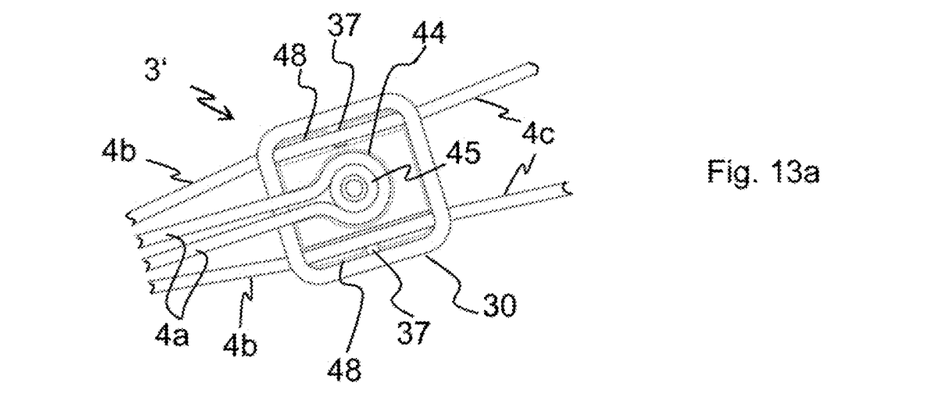
FIG. 13a shows a view in perspective of the insert from FIG. 12 inserted into the first part in a section at half height through the insert and cord pieces arranged therein.

The associated insert 40, as shown in FIGS. 11a and b, having an upper surface 41 and circumferential side surface 42, comprises at one location a recess 43 leading into a groove 44 with a U-turn, wherein a middle part 45 surrounded by the groove is arranged in the center. The middle part 45 has a recess into which the spring 26 can be inserted. The insert 40 has a laterally extending guide groove 48 respectively on both sides of the recess 43, through which a cord can be guided. For assembled parts 30 and 40, the positions of the two recesses 33 and 43 correspond. Also the positions of the four openings 34 and 35 of the cup-shaped part 30 correspond with the entrances and exits of the guide grooves 48 of the insert 40. In the assembled device 3', as shown in FIGS. 13a and b, the cord is again placed in the groove 44 with the U-turn and guided through the recess 43 of the insert 40 and through the recess 33 of the cup-shaped part 30.

Figure 12:
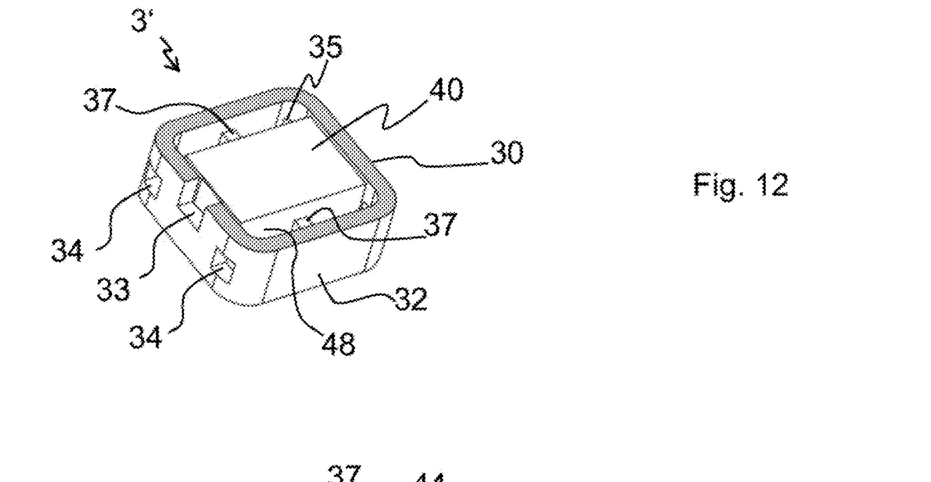
FIG. 12 shows a view in perspective of the insert from FIGS. 11a and 11b inserted into the first part in a section below the upper edge of the insert.
Figure 13B:
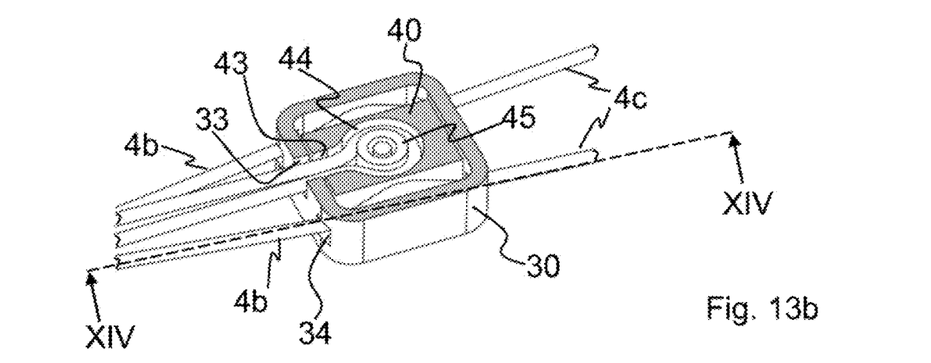
FIG. 13b shows a view from above of the insert from FIG. 12 inserted into the first part in a section at half height through the insert and cord pieces arranged therein.

In this embodiment, the elements for inhibiting and deflecting the cord in the guide to grooves are formed by projections 37 in the cup-shaped part 30, which engage through correspondingly positioned recesses 47 in the insert 40 and project into the guide grooves 48. The projections 37 are shown in FIGS. 10 and 12. The corresponding recesses 47 in the guide grooves 48 of the insert 40 are shown in FIGS. 11a and b and indicated in FIG. 13a. In this case, the cord pieces 4a and 4b lead to a musical instrument and the cord pieces 4c lead again to a carrying strap or carrying frame on the musician. The cord pieces placed in the guide grooves 48 are guided over the projections 37 and thereby deflected, as shown in FIG. 13b. The deflection in this example is in the direction perpendicular to the base 31 of the part 30 and the surface 41 of the insert 40. In the example shown according to FIGS. 1-9, however, the deflection is in a direction parallel to the base surfaces 11 and 21 of the two parts 10 and 20. Their function of causing friction to increase the stability of the device is the same in both embodiments.

Figure 14:
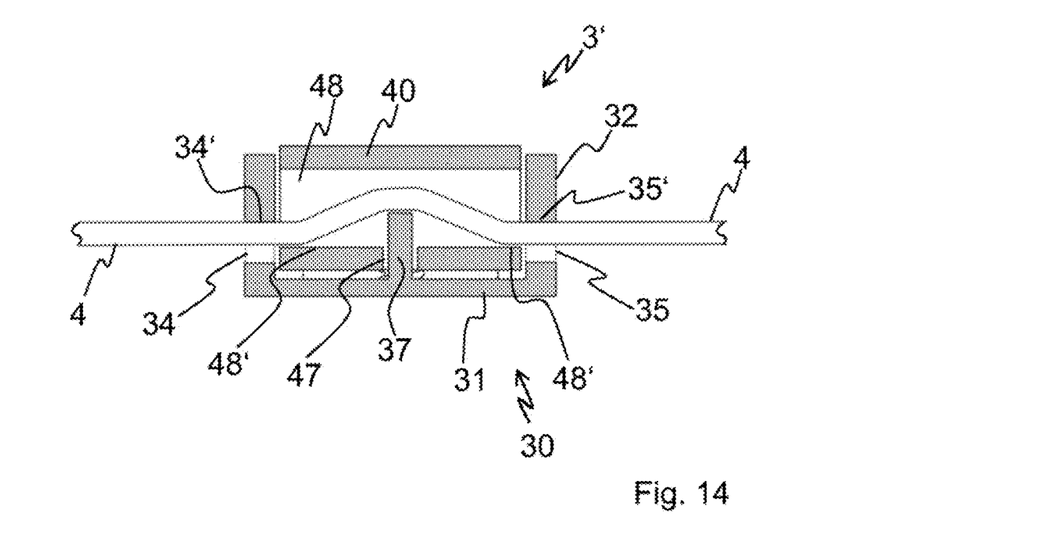
FIG. 14 shows a view according to the section XIV-XIV in FIG. 13b of the device with the two interlaced parts and a cord piece clamped with the spring released.

FIG. 14 shows in a cross-section the deflection of the cord 4 by means of the projections 37, which project through the recess 47 into the guide groove 48. The figure shows the situation with pressed spring. When the spring is released, the insert 40 lifts and the cord is clamped and locked between the upper edge 34' and 35' of the opening 34 or 35 and the lower surface 48' of the guide groove 48, as in the example in FIG. 8.

Figure 15:
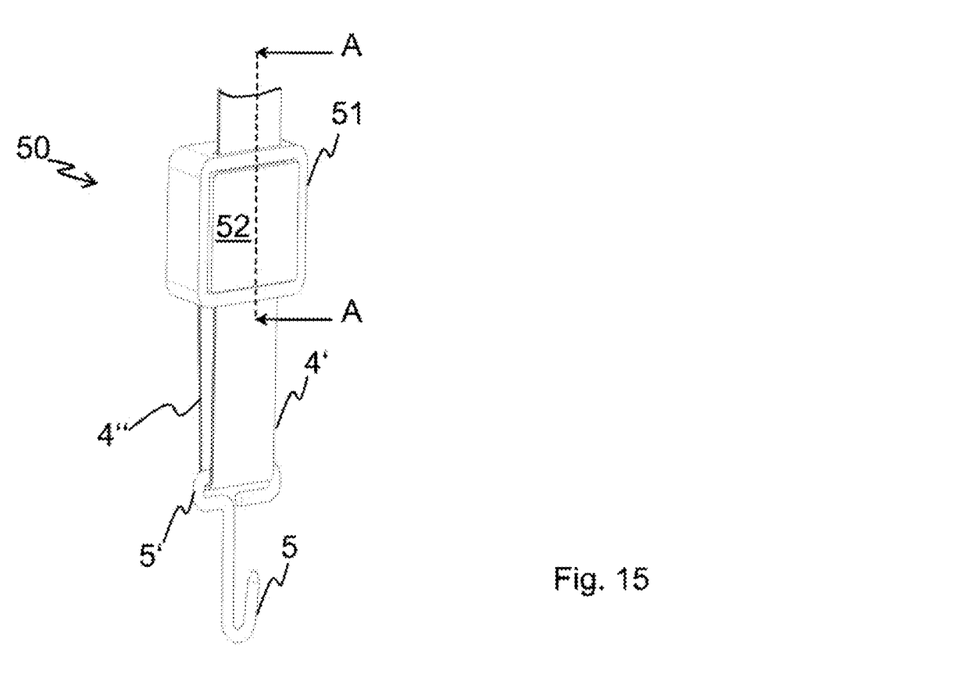
FIG. 15 shows an example of a second embodiment of the invention, a device for adjusting the length of straps or flat cords.

FIG. 15 shows the device 50 according to the second embodiment for use with flat cord straps. The device 50 for the length adjustment of straps or flat cords 4', 4" again has an outer, cup-shaped part 51 and an insert 52. The straps 4', 4", e.g. woven straps, lead through an eyelet 5' with a hook 5, which can be attached to a musical instrument, e.g. a saxophone.

Figure 16:
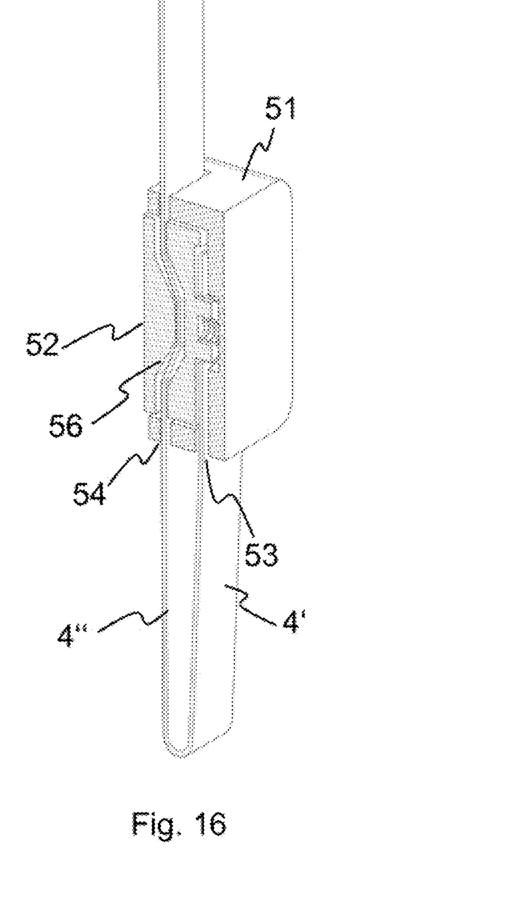
FIG. 16 shows a cross-section along A-A of the device of FIG. 15 rotated about a vertical axis.

FIG. 16 shows the guidance of the straps 4', 4" through the two parts 51 and 52.

For this purpose, the cup-shaped part 51 comprises an entrance opening 53 and the insert part comprises a first opening 54 and a second, opposite opening 55. These have an elongated cross-section which is adapted to a strap. The ends of the straps 4', 4" are held in the insert part 52 in a groove with a recess through which the straps 4', 4" are guided out. The insert 52 also has a channel 56, in this case a passage 56.

Figure 17:
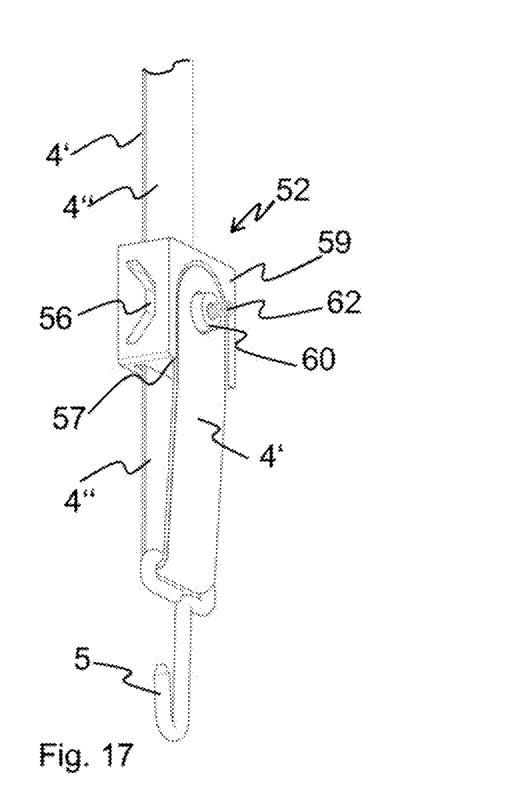
FIG. 17 shows the use of the device of FIG. 15 with inserted straps.

FIG. 17 shows the insert part 52 with a recess 57, into which two straps 4', 4" laid on top of each other are inserted, leading a groove 58 with a U-shaped U-turn. The groove 58 is formed by the circumferential edge 59 of the insert 52 and a middle part 60. In the middle part 60 there is a depression 61 for inserting a spring 62 (see FIG. 18). The straps 4', 4" have a hole near their ends, which is placed over the middle part 60 with the spring 62, thus holding the straps there.

Figure 18:
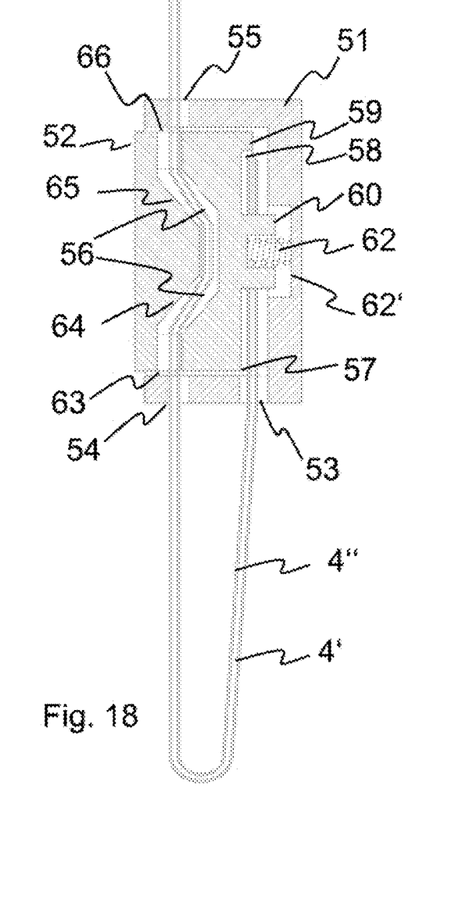
FIG. 18 shows an enlargement of the cross-section from FIG. 16.
Figure 19:
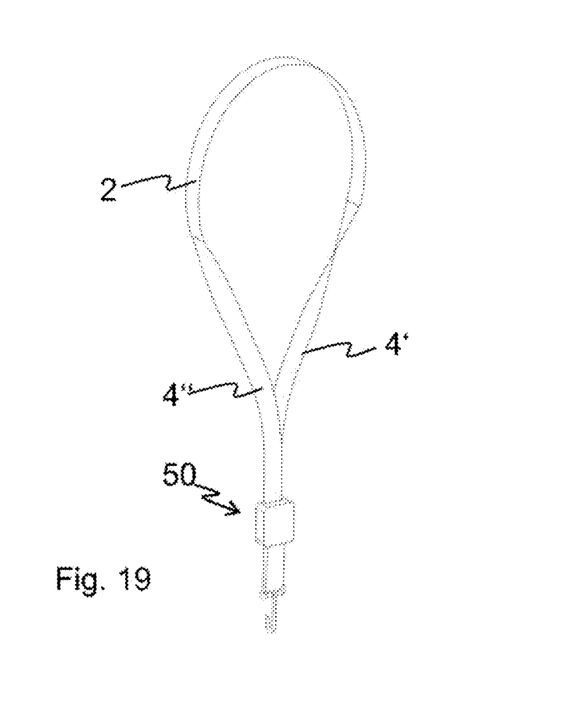
FIG. 19 shows the device according to the second embodiment with neck strap.

FIG. 18 shows the guidance of the straps 4', 4" in the two parts 51 and 52. The two straps 4', 4" are arranged in the groove 58 by placing their hole over the middle part 62, wherein the middle part 62 engages in a depression 62' in the base of the cup-shaped part 51. The straps 4', 4" lead out of the device 50 from the groove 58 through the recess 57 of the insert 52 through the entrance opening 53 in the cup-shaped part 51. After passing through an eyelet (as shown in FIG. 15), the straps lead through the first opening 54 of the cup-shaped part 51 into the device 50 and through the entrance 63 into the passage 56 in the insert 52. In the passage 56, the straps 4', 4" are guided over elements for inhibiting their movement, which in this example are formed by surfaces 64 and 65 angled to one another, which are connected by another surface. Via an exit 66 of the passage 56, the straps lead out of the device to the second opening 55 of the cup-shaped part 51. The two straps 4', 4" then lead to a neck strap 2 as shown in FIG. 19, which can be wrapped around the neck of a musician.

Figure 20:
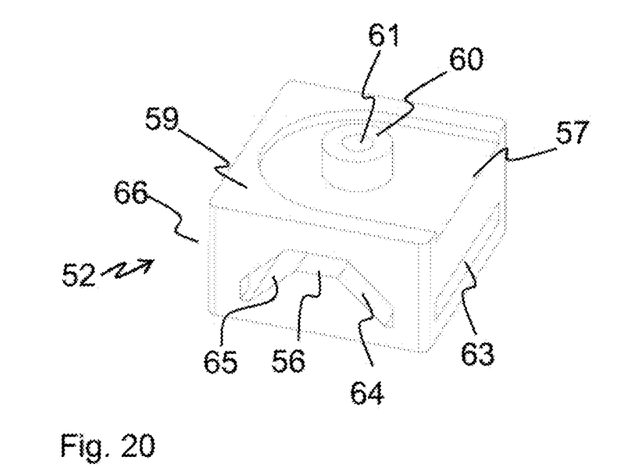
FIG. 20 shows the use of the device from FIG. 15.

FIG. 20 shows the insert part 52 in perspective with the groove 58 with middle part 60 to hold the straps. In the middle part 60 the depression 61 for the placement of a spring is shown. A recess 57 in the circumferential edge 59 of the insert part 51 leads into the groove and out of the groove 58. The entrance 63 to the passage 56 is arranged adjacent to the recess 57 and separated from the recess 57. In addition, the surfaces 64 and 65 angled to one another are shown in passage 56, which inhibit the movement of the straps through the passage. The exit 66 from passage 56 is located at the rear side of the insert part 52.

Figure 21:
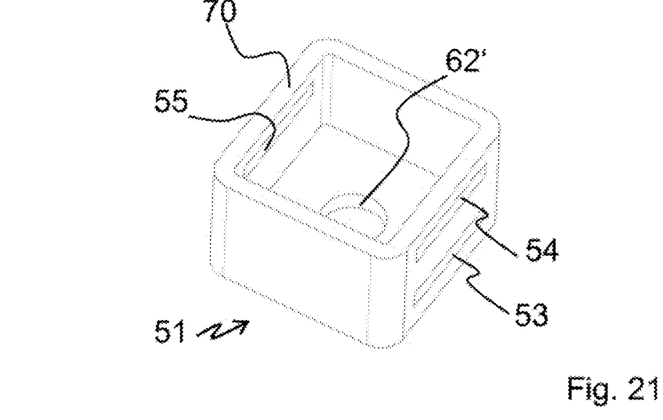
FIG. 21 shows the cup-shaped part of the device from FIG. 15.

FIG. 21 shows the cup-shaped outer part 52 in perspective and in particular in its circumferential wall 70 the entrance opening 53 as well as the first opening 54 separated from it. The second opening 55 is located on the rear side of the cup-shaped part 51. The openings 53, 54 and 55 coincide with the recess 57, with the entrance 63 and with the exit 66 of the passage 56, respectively, when the two parts 51 and 52 are assembled. This means that when the spring is released, these openings partly coincide so that the straps are clamped in the openings. When the spring is compressed, the cross-sections of these openings coincide completely so that the straps can be moved. In the base of the outer part 52 the depression 62' is arranged, into which the middle part 60 fits.

Figure 22:
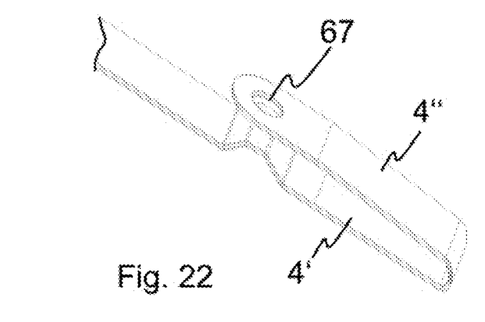
FIG. 22 shows the shape of the superimposed straps when placed in the device from FIG. 15.

FIG. 22 shows the shape of the straps 4', 4" as they would lie on top of each other in the device 50. Close to their ends they have a hole 67, which can be placed over the middle part 60.

LIST OF REFERENCE NUMERALS

1 Carrying device for carrying a musical instrument
2 Carrying strap/neck strap
3 Device for adjusting the length of a cord
3' Variant of the first embodiment of the device for adjusting the length of a cord
4 Cord
4a,b,c Cord piece
4', 4" Flat cord, strap
5 Hook
5' Eyelet
10 First, outer part of the device for adjusting the length, cup-shaped part
11 Base of the first part
12 Circumferential edge of the first part
13 Recess
14 Openings at the bottom edge of the first part
15 Openings at the upper edge of the first part
16 Pin
20 Second, inner part of the device for adjusting the length, insert part
21 Upper surface of the second part, insert part
22 Circumferential surface of the second part
23 Recess
24 Groove with U-turn
25 Middle part of the groove 24 with recess for spring
26 Spring
27 Lateral guide groove
28 Inner wall of lateral guide groove
28' Surface of the guide groove 28
29 Element for deflecting/inhibiting the movement of the cord
29' Connection between surfaces 29
30 Cup-shaped first part
31 Base
32 Circumferential edge
33 Recess
34 Openings at the lower end
35 Openings at the upper end
36 Pin
37 Element to inhibit the movement of the cord, projection
40 Insert part
41 Upper surface
42 Circumferential edge surface
43 Recess
44 Guide groove with U-turn
45 Middle part of the groove with recess for spring
47 Recess for projection 37
48 Lateral guide groove
48' Surface of the guide groove 48
50 Device, second embodiment
51 Cup-shaped part
52 Insert part
53 Entrance opening
54 First opening
55 Second opening
56 Passage
57 Recess
58 Groove
59 Circumferential edge 60 Middle part
61 Depression
62 Spring
63 Entrance to passage
64 Angled surface
65 Angled surface
66 Exit from passage
67 Hole in strap

The invention claimed is:

1. A device configured to adjust the length of a cord used for carrying a musical instrument, said device comprising:
   a first part formed in a cup-shaped manner;
   a second part formed as an insert; and
   a spring arranged between the first and second parts,
   wherein the first and second parts can be pushed into each other,
   wherein the cup-shaped first part has, in a circumferential edge, a first recess or entrance opening configured to guide two cord pieces or two straps and at least two further openings in the circumferential edge configured to guide two further cord pieces or two further straps, wherein the first of the at least two further openings is arranged adjacent to the recess or entrance opening and the second of the at least two further openings is arranged opposite the first said further opening in the circumferential edge,
   wherein the insert has a middle part, a circumferential edge, and a groove with a U-turn formed by the circumferential edge and the middle part, and the circumferential edge has a second recess leading into the groove, and the insert further comprising at least one channel configured to receive one cord piece or one strap in each such channel, wherein each such channel includes elements configured to deflect and inhibit the movement of the cord piece or the strap received in said channel, and each of the at least one channel is completely separated from the groove with the U-turn.

2. The device according to claim 1, wherein the at least two further openings comprise:
   four further openings configured to receive one cord piece each, wherein the first and second openings of these four further openings are arranged on both sides of the first recess or entrance opening in the cup-shaped first part and the third and fourth openings are arranged opposite the first and second opening in the circumferential edge,
   wherein the insert has on the outside of the circumferential edge and on both sides of the second recess two lateral guide grooves, each configured to receive a respective one cord piece, and said lateral guide grooves having elements configured to deflect and inhibit the movement of a cord piece received therein, wherein said lateral guide grooves are completely separated from the groove with the U-turn in the insert.

3. The device according to claim 2, wherein the insert has a third recess in the middle part for accommodating the spring.

4. The device according to claim 3, wherein the cup-shaped first part includes a pin arranged in the interior of said first part and the insert includes the third recess arranged in its middle part configured to accommodate the spring, wherein the pin is configured to fix the position and alignment of the spring within the third recess.

5. The device according to claim 2, wherein the elements configured to deflect and inhibit the movement of a cord piece through the lateral guide grooves are formed by mutually angled surfaces.

6. The device according to claim 2, wherein the elements configured to deflect and inhibit the movement of a cord piece through the lateral guide grooves comprise projections in the cup-shaped first part and fourth recesses in the insert, wherein the projections in the cup-shaped first part extend in the interior of said first parperpendicularly away from its base surface, and the fourth recesses in the insert are arranged in the circumferential edge of the insert, wherein the projections engage in the fourth recesses and project into the lateral guide grooves.

7. The device according to claim 1, wherein the first recess or entrance opening in the cup-shaped first part comprises an entrance opening configured to guide two cord pieces or two straps, and the first further opening is arranged adjacent to the entrance opening and the second further opening is arranged opposite the first further opening on the circumferential edge of the cup-shaped first part, and
   wherein the at least one channel formed in the insert comprises a passage leading from an entrance adjacent the entrance opening in the cup-shaped first part to an exit opposite the entrance in the insert, wherein the passage includes the elements configured to deflect and inhibit the movement of the cord nieces or the straps, and the groove of the insert is completely separated from the entrance of the passage.

8. The device according to claim 7, wherein the insert includes a third recess arranged in its middle part configured to accommodate the spring.

9. The device according to claim 7 wherein the elements configured to deflect and inhibit the movement of the cord pieces or the straps are configured to inhibit the movement of a cord piece or strap through the passage by mutually angled surfaces.

10. The device according to claim 7, wherein the cup-shaped first part includes a pin arranged in the interior of said first part and the insert includes a third recess arranged in its middle part configured to accommodate the spring, wherein the pin is configured to fix the position and alignment of the spring within the third recess.

11. A carrying device configured to carry a musical instrument comprising:
   a device according to claim 1;
   at least one of a carrying strap for the neck of a user or a carrying frame for shoulders of a user
   a cord; and
   an attachment for the cord to the musical instrument.

12. The carrying device according to claim 11, wherein the attachment of the cord to the musical instrument is a hook with an eyelet.

* * * * *

UNITED STATES PATENT AND TRADEMARK OFFICE
CERTIFICATE OF CORRECTION

| | | |
|---|---|---|
| PATENT NO. | : 10,964,297 B2 | Page 1 of 1 |
| APPLICATION NO. | : 16/737287 | |
| DATED | : March 30, 2021 | |
| INVENTOR(S) | : Silvin Jancic | |

It is certified that error appears in the above-identified patent and that said Letters Patent is hereby corrected as shown below:

In the Claims

Column 14, Line 30, delete "nieces" and insert --pieces--.

Signed and Sealed this
Third Day of September, 2024

Katherine Kelly Vidal
*Director of the United States Patent and Trademark Office*